United States Patent [19]

Cohen

[11] 4,440,472
[45] Apr. 3, 1984

[54] SPACE INTEGRATING AMBIGUITY PROCESSOR

[75] Inventor: Jonathan D. Cohen, Severn, Md.

[73] Assignee: The United States of America as represented by the Director of National Security Agency, Washington, D.C.

[21] Appl. No.: 257,061

[22] Filed: Apr. 24, 1981

[51] Int. Cl.³ .................. G02B 5/18; G06G 9/00; G01S 13/58
[52] U.S. Cl. .................. 350/162.12; 364/822; 343/9 PS
[58] Field of Search .......... 350/162.12; 364/822; 343/9 PS

[56] References Cited

U.S. PATENT DOCUMENTS

| | | | |
|---|---|---|---|
| 4,225,938 | 9/1980 | Turpin | 350/162.12 |
| 4,310,894 | 1/1982 | Lee et al. | 364/822 |
| 4,389,092 | 6/1983 | Tamura | 350/162.12 |

OTHER PUBLICATIONS

Said, R. A. K., and Cooper, D. C., "Crosspath Real-Time Optical Correlator and Ambiguity Function Processor", *Proceedings of the IEEE*, vol. 120, No. 4, Apr. 1973, pp. 423-428.

Primary Examiner—Bruce Y. Arnold
Assistant Examiner—William Propp
Attorney, Agent, or Firm—Thomas O. Maser; John R. Utermohle

[57] ABSTRACT

A space integrating optical ambiguity processor in which two one-dimensional modulators provide two-dimensional processing capability. Signals to be processed drive orthogonal Bragg cells oriented 40° to the axes of the output detector. The resulting product is transformed in one dimension and imaged in the other, thereby creating a light intensity distribution representative of the cross ambiguity between the input signals.

5 Claims, 1 Drawing Figure

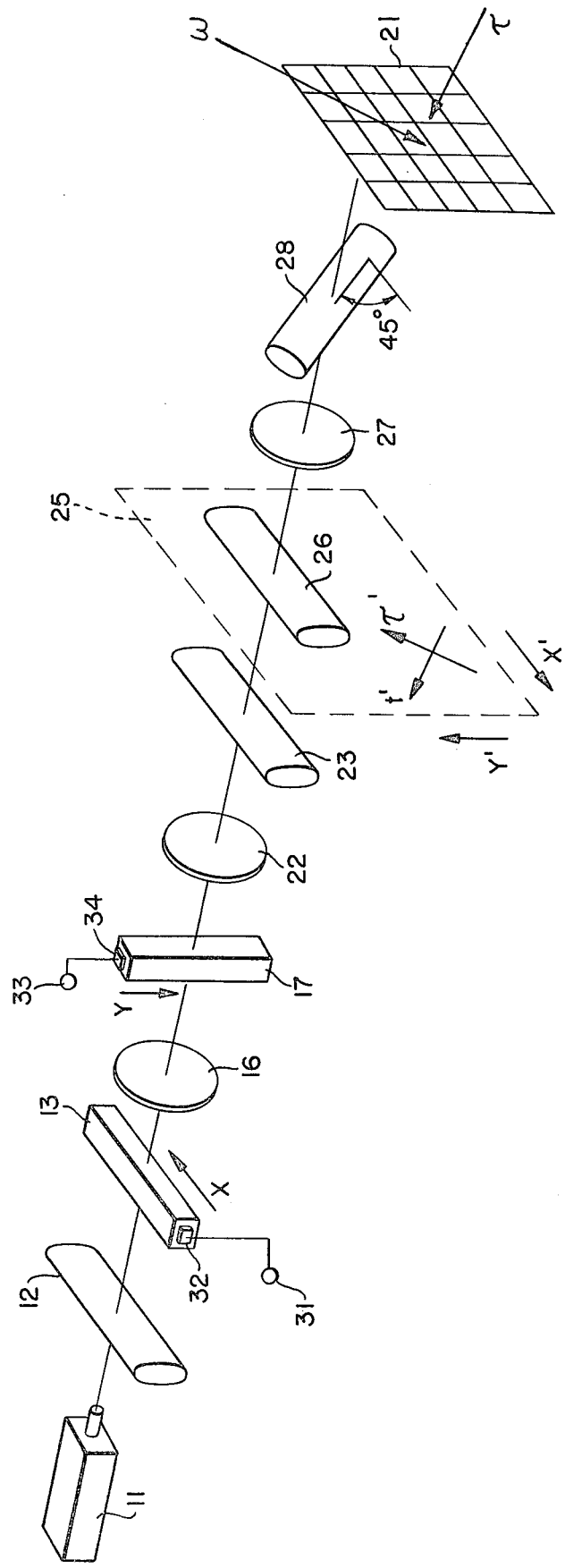

SPACE INTEGRATING AMBIGUITY PROCESSOR

BACKGROUND OF THE INVENTION

1. Field of the Invention

This invention relates to the field of optical processing, and more specifically to space integrating optical processors for performing real-time correlations, transforms, and other processing operations.

2. Description of the Prior Art

It is often desirable to process information-bearing signals of large bandwidth in real time. This is particularly true in communications and radar signals processing. General purpose digital computers are capable of performing many of these operations; however, because of their limited speed, they are incapable of performing any but the simplest of such processing operations in real time. Special purpose digital signal processors, configured as array processors, typically can perform real-time processing operations if the bandwidth of the signal and the data rate are not too large, and if a considerable expense is acceptable.

Because of their large time-bandwidth products and relative simplicity, optical processors represent an attractive alternative to processing high data-rate signals, and space integrating optical processors may be found in the prior art. Space integrating architectures are characterized by having one or more integrations essential to the result being performed by lenses.

Two-dimensional optical processors known in the prior art commonly utilize photographic film as an information source, thereby precluding effective real-time operation. When a real-time capability is required, a coherent light valve might be used. However, these relatively bulky and expensive devices suffer from spatial and temporal nonuniformities. Additionally, a highly complex electronic driving mechanism would also be required.

Shortly after the development of two-dimensional acousto-optical devices, experiments proved their applicability to optical processing. An example of these experiments is found in Said, R. A. K., and Cooper, D. C.: "Crosspath Real-Time Optical Correlator and Ambiguity Function Processor," Proc. IEE, v. 120, No. 4, April 1973, pp 423-428. The authors describe an apparatus in which a two-dimensional Bragg cell is utilized to generate ambiguity diagrams. Significant problems are mentioned in the article, including the generation of unwanted diffracted light components which must be filtered, and operability of the apparatus only if applied signals have a relatively small bandwidth. Apparently, little further reported research has been performed using two-dimensional acousto-optical devices to the present time.

U.S. Pat. No. 4,225,938 to Turpin, incorporated herein by reference, describes a two-dimensional time integrating acousto-optical processor utilizing two one-dimensional Bragg cells. Much of the structure described therein has direct applicability to my invention.

SUMMARY OF THE INVENTION

It is an object of this invention to provide a two-dimensional space-integrating optical processor which overcomes the limitations of the prior art.

It is a further object to provide an optical processor capable of implementing the ambiguity function to test large numbers of time-frequency hypotheses in real time.

It is a still further object to provide an apparatus which accommodates large-bandwidth signals.

Another object is to provide an apparatus which has large processing gain for estimation in a noisy environment.

An apparatus having these and other desirable features would include means for providing a coherent light beam; a two-dimensional detector; means for modulating the light beam in a first signal dimension, x, said x-modulating means including a first one-dimensional spatial light modulator to which is provided a first modulating signal; means for expanding the x-modulated beam in a second, mutually orthogonal spatial dimension, y; means for modulating the light beam in the second spatial dimension, said y-modulating means including a second one-dimensional spatial light modulator to which is provided a second modulating signal; optical means for focusing the twice-modulated light beam at a plane perpendicular to the beam such that position in one direction $t'$ on the plane corresponds to time delay in both modulating signals and position in a perpendicular direction $\tau'$ on the plane corresponds to relative time delay between the modulating signals; optical means in said plane for matching the phase of the modulating signals within said focused beam, and optical means for imaging said phase-matched beam along one axis $t'$ and transforming said beam along a perpendicular axis $\omega$ and for illuminating the detector with the resulting light beam.

BRIEF DESCRIPTION OF THE DRAWING

My invention may be best understood by reading the specification with reference to the accompanying FIGURE, which illustrates the principle of my invention.

DESCRIPTION OF THE PREFERRED EMBODIMENT

My invention has particular utility for processing signals received with one or more unknown parameters. For example, consider a transmitted radar signal $s(t)$ which is received as $g(t) = ks(t - \tau_o)$ after returning from a target. Determination of $\tau_o$ gives the target range, while k is related to other factors such as physical characteristics of the target and atmospheric attenuation. Because the signal will necessarily also include some noise $n(t)$, the values for k and $\tau_o$ will not be exact and can only be estimated. For purposes of the following discussion, these estimates will be referred to as $\hat{k}$ and $\hat{\tau}$. One approach to determining $\hat{k}$ and $\hat{\tau}$ is to put $g(t)$ through a matched filter having impulse response $h(t) = s(T-t)$, where T is the duration of $s(t)$. The filter's output is then $$z(t) = \int_0^t g(t')h(t-t')dt' + z_n(t) \quad (1)$$

$$= k \int_{T-t}^{T} s(t' - \tau_o + t - T)s(t')dt' + z_n(t),$$

where $$z_n(t) = \int_0^t n(t)s(T-t)dt.$$

Since $E\{z_n(t)\}=0$, it is most likely that $z(t)$ reaches a maximum at $t_o$ when $t_o-\tau_o-T=0$. It is clear that $\hat{\tau}=t_o-T$ is the best choice. Also, $$k = z(t_o)\left[\int_{t-t_o}^{T} s^2(t')dt'\right]^{-1}.$$

If the target is moving, a doppler frequency shift $\omega_o$ will be imparted to the returned radar signal such that $$g(t)=ks(t-\tau_o)e^{j\omega_o t} \tag{2}$$

It is not practical to try a determination of $\hat{\tau}$ by generating an ensemble of integrals of the form $\int g(t)s(t-t_i)dt$, because the phase of the product $g(t)s(t-t_i)$ is changing at a rate of $\omega_o$ radians per second. If the integration time T is not much less than $(2\pi/\omega_o)$, the integral will not build up.

A solution is to remove the phase change by introducing the term $e^{-j\omega t}$ into the integral, where $\omega$ is an estimate of $\omega_o$. To test the hypothesis $(\tau_i,\omega_i)$, an ensemble of integrals of the form $$A(\tau_i,\omega_i)=\int_T g(t)s(t-\tau_i)e^{-j\omega_i t}dt \tag{3}$$

may be performed. In the case where $\omega_i=\omega_o$, the integral in (3) reduces to the correlation shown in (1) except that k is complex. One may choose a hypothesis that maximizes $|A(\tau_i,\omega_i)|$ and set $\tau=\tau_i$ and $\omega=\omega_i$. Note that $$A(\tau_o,\omega_o)=\int_T k|s(t-\tau_o)|^2 dt,$$

so that $$k=[\int_T|s(t-\tau)|^2 dt]^{-1}A(\tau,\omega)$$

provides an estimate of k.

The function $$A(\tau,\omega)=\int_T g(t)s(t-\tau)e^{-j\omega t}dt \tag{4}$$

is called the "ambiguity function" and is recognized as being useful for comparing the two singals $g(t)$ and $s(t)$. When $g(t)$ and $s(t)$ are the same, equation (4) is called the "autoambiguity function", and when they are different, it is called the "cross-ambiguity function."

My invention provides a novel optical apparatus which correlates two received signals in accordance with formula (4) above, and is capable of testing more than $10^5$ hypotheses in real-time with bandwidths up to several gigahertz.

A space integrating ambiguity processor embodying the concepts of my invention is illustrated in the FIGURE. A coherent light source 11 produces an unmodulated light beam which is projected by a cylindrical lens 12 onto a first one-dimensional acousto-optic modulator 13. The modulated light beam is projected by a spherical lens 16 onto a second one-dimensional acousto-optic modulator 17 oriented orthogonally to modulator 13. The resulting twice-modulated light beam is passed through processing optics and projected onto a two-dimensional detector 21. The processing optics includes a spherical lens 22, a cylindrical lens 23, a cylindrical lens 26, a spherical lens 27 and a cylindrical lens 28. A first input terminal 31 is connected to a transducer 32 attached to modulator 13, and a second input terminal 33 is connected to a transducer 34 attached to modulator 17.

Light source 11 is preferably a laser. Modulators 13 and 17 are preferably those commonly known as 1-dimensional Bragg cells. Their function, which is well documented in the prior art, is to modulate a light beam with an electrical signal by means of acousto-optic interaction. Each cell usually consists of a block of transparent crystalline material, such as $TeO_2$, to which a transducer is mounted at one end. When the transducer is driven electrically, an acoustic wave is launched which propagates down the length of the crystal at a velocity v characteristic of the material. As the wave propagates, strains are produced which cause variations in the optical index of the material. Light enters the cell at an angle to the perpendicular known as the Bragg angle. As it passes through the acoustic disturbance, some light is diffracted away from a straight course and exits at an angle different from the remaining undiffracted light. The effect is to extract the complex envelope of the signal, which then becomes the diffracted light amplitude. For a crystal of length L, a signal of duration equal to $(L/v)$ seconds is present in the cell at each instant, and the diffracted light bears an image of the imput signal over the interval $(t-L/v,t)$ at any instant t.

In operation, the processor accepts two inputs with complex envelopes $f(t)$ and $g(t)$ and forms the product $f(t-a)\cdot g(t-b)$ for all a and b in the interval $(O,T_B)$ where $T_B$ is the Bragg cell aperture. More specifically, a collimated coherent light beam from source 11 passes through cylindrical lens 12 and converges to a horizontal line (referred to hereafter as the x-direction) in the focal plane where it illuminates the length of modulator 13. A signal $f(t)$ is provided at input 31 by a means which is not shown. Light diffracted by modulator 13 has an amplitude proportional to $f(t-(x/v))$. Modulator 13 is in the front focal plane of lens 16 so the diffracted light is expanded vertically (referred to hereafter as the y-direction) as it passes through lens 16. Since the light beam from modulator 13 enters lens 16 horizontally collimated, it converges to a vertical line in the back focal plane of lens 16 where it illuminates the length of modulator 17. A second signal $g(t)$ is provided at input 33 by a means not shown. The light diffracted by modulator 17 has an amplitude proportional to $g(t-y/v)$. Modulator 17 is placed in the front focal plane of lens 22 so that the horizontally diverging light beam leaving modulator 17 is collimated by lens 22 and passes unchanged horizontally by lens 23 to a plane 25 which is in the back focal plane of lenses 22 and 23. It is apparent that passage of the light beam through modulators 13 and 17 to plane 25 entails two Fourier transforms in the horizontal direction, thereby serving to reconstruct the horizontal variation of the plane of modulator 13 in the plane 25. Similarly, lenses 22 and 23 combine to image the light beam from modulator 17 onto plane 25 in the vertical direction. Since lens 23 performs its transform on an image which is not in its front focal plane, there is a quadratic phase error to the resultant image. A cylindrical lens 26 is placed in plane 25 to remove the phase error, thereby matching the phases of the two modulating signals within the focused beam. The result is an image plane at plane 25 where the instantaneous light amplitude $p(x,y)$ is equal to the product of $f(t-x'/v)$ and $g(t-y'/v)$ where $x'$ and $y'$ represent the original x and y axes, but in the plane 25. At this point it is convenient to choose new axes $t'$ and $\tau'$ in plane 25 but rotated 45° to the x' and y' axes. If $t'=(x'+y')/2v$ and $\tau'=-(x'+y')/2v$, it follows that $$p'(t',\tau') = p[(t'-\tau')v, (t'+\tau')v] \qquad (5)$$
$$= f(t-t'-\tau')g(t-t'+\tau').$$

For fixed t, movement along the t' axis corresponds to a delay in both inputs, while varying $\tau'$ causes a change in relative time delays between the two inputs.

Spherical lens 27 and cylindrical lens 28 combine to image the rotated horizontal axis $\tau'$ in plane 25 onto detector 21, forming the $\tau$ axis. Lens 27 transforms along the t' axis to form a frequency axis $\omega$ on detector 21. Lens 28 must be rotated 45° from the horizontal because of the previously identified 45° rotation of the light signal. The result on detector 21 is a light energy distribution $$z(\tau,\omega) = \left| \int_{-T_B/2\sqrt{2}}^{T_B/2\sqrt{2}} p'(t',\tau/2) e^{j\omega t'} dt' \right|^2 \qquad (6)$$

$$= \left| \int_{t+\frac{\tau}{2}-\frac{T_B}{2\sqrt{2}}}^{t+\frac{\tau}{2}+\frac{T_B}{2\sqrt{2}}} f(\lambda)g(\lambda-\tau)e^{-j\omega\lambda}d\lambda \right|^2$$

where a change of variables has been made. The integral of equation (6) may be recognized as the ambiguity function defined in equation (4) with the exception of the integration limits. The integration period has been truncated to $T_B/\sqrt{2}$ seconds, the result of which will become apparent later. Also, the integration window shifts with $\tau$, an effect which may be shown to be insignificant. By defining the function $$p_1(t) = rect\frac{t\sqrt{2}}{T_B},$$

where $$rect(x) = \begin{cases} 1, & \text{if } |x| < \frac{1}{2} \\ 0, & \text{otherwise,} \end{cases}$$

equation (6) may be written as $$z(\tau,\omega,t) = \left| \int_{-\infty}^{\infty} p_1(\lambda-t-\tau/2) \cdot f(\lambda) \cdot g(\lambda-\tau)e^{-j\omega\lambda}d\lambda \right|^2. \qquad (7)$$

Finally, detector 21 integrates $z(\tau,\omega,t)$ for a period T, chosen to be the interval $[-T/2, T/2]$ for simplicity. The detector's output is $$C(\tau,\omega,t) = \int_{-T/2}^{T/2} z(\tau,\omega,t')dt' \qquad (8)$$

$$= \int p_2(t'-t-\tau/2) |\int p_1(\lambda-t')f(\lambda)g(\lambda-\tau)e^{-j\omega\lambda}d\lambda|^2 dt',$$

where $$p_2(t) = rect\left(\frac{t}{T}\right).$$

It is reasonable to approximate $p_2(t'-t-\tau/2)$ by $p_2(t'-t)$ in the integral, giving $$C(\tau,\omega,t) = \int p_2(t'-t) |\int p_1(\lambda-t')f(\lambda)g(\lambda-\tau)e^{-j\omega\lambda}d\lambda|^2 dt' \qquad (9).$$

As shown by (9), the processor provides the square modulus of the ambiguity function integrated over period T.

Hypothesis range and resolution, number of hypotheses tested, signal bandwidth and noise performance are determined by the characteristics of the modulators and detector utilized. Bandwidths on generally available Bragg cells are usually an octave, and range from about 10 Mhz to several gigahertz. Detector arrays of the type developed for commercial television have an integration time of approximately 33 ms. The maximum available number of pixels, which ultimately constrains the number of hypotheses tested, is currently about $2 \times 10^5$.

An apparatus was built for the purpose of testing the concepts of this invention. It included a HeNe laser which illuminated 30 $\mu$s of two TeO$_2$ Bragg cells having a propagation velocity of 0.6 mm/sec. The cells had a bandwidth of 20 MHz, and hence an effective time-bandwidth product of 600. Imaging optics employed f/5 lenses of 20 cm focal length, with a 100 cm focal length lens serving as the transform lens 27. The detector was a silicon target vidicon having a low modulation transfer function of 0.5 at 90 lines, corresponding to an effective number of pixels of approximately $10^4$.

My invention will be particularly useful to provide a relatively inexpensive and reliable solution to the problem of realtime time versus frequency correlation when a large number of hypotheses must be searched over a wide frequency span. It should be understood that my invention may take many forms other than the embodiment described above, and that I intend that my invention be limited only as set forth in the appended claims.

I claim:

1. A two-dimensional optical processor, comprising:
   means for providing a coherent light beam;
   a two-dimensional detector;
   means for modulating the light beam in a first spatial dimension, x, said x-modulating means including a first one-dimensional spatial light modulator to which is provided a first modulating signal;
   means for expanding the x-modulated beam in a second, mutually orthogonal spatial dimension, y;
   means for modulating said expanded x-modulated beam in the second spatial dimension, said y-modulating means including a second one-dimensional spatial light modulator to which is provided a second modulating signal;
   optical means for focusing the twice-modulated light beam at a plane perpendicular to the beam such that position in one direction t' on the plane corresponds to time delay in both modulating signals and position in a perpendicular direction $\tau'$ on the plane corresponds to relative time delay between the modulating signals;
   optical means in said plane for matching the phase of the modulating signals within said focused beam, and optical means for imaging said phase-matched beam along one axis $\tau'$ and transforming said beam along a perpendicular axis $t'$ and for illuminating the detector with the resulting light beam.

2. The apparatus of claim 1 wherein said first modulating signal is a transmitted radar signal and said second modulating signal is a received radar signal.

3. The apparatus of claim 1 wherein said means for providing a coherent light beam is a laser.

4. The apparatus of claim 1 wherein said one-dimensional spatial light modulators are acousto-optic modulators.

5. The apparatus of claim 1 wherein said phase matching means includes means for removing the quadratic phase error for said focused beam.

* * * * *